3 Sheets, Sheet 2.

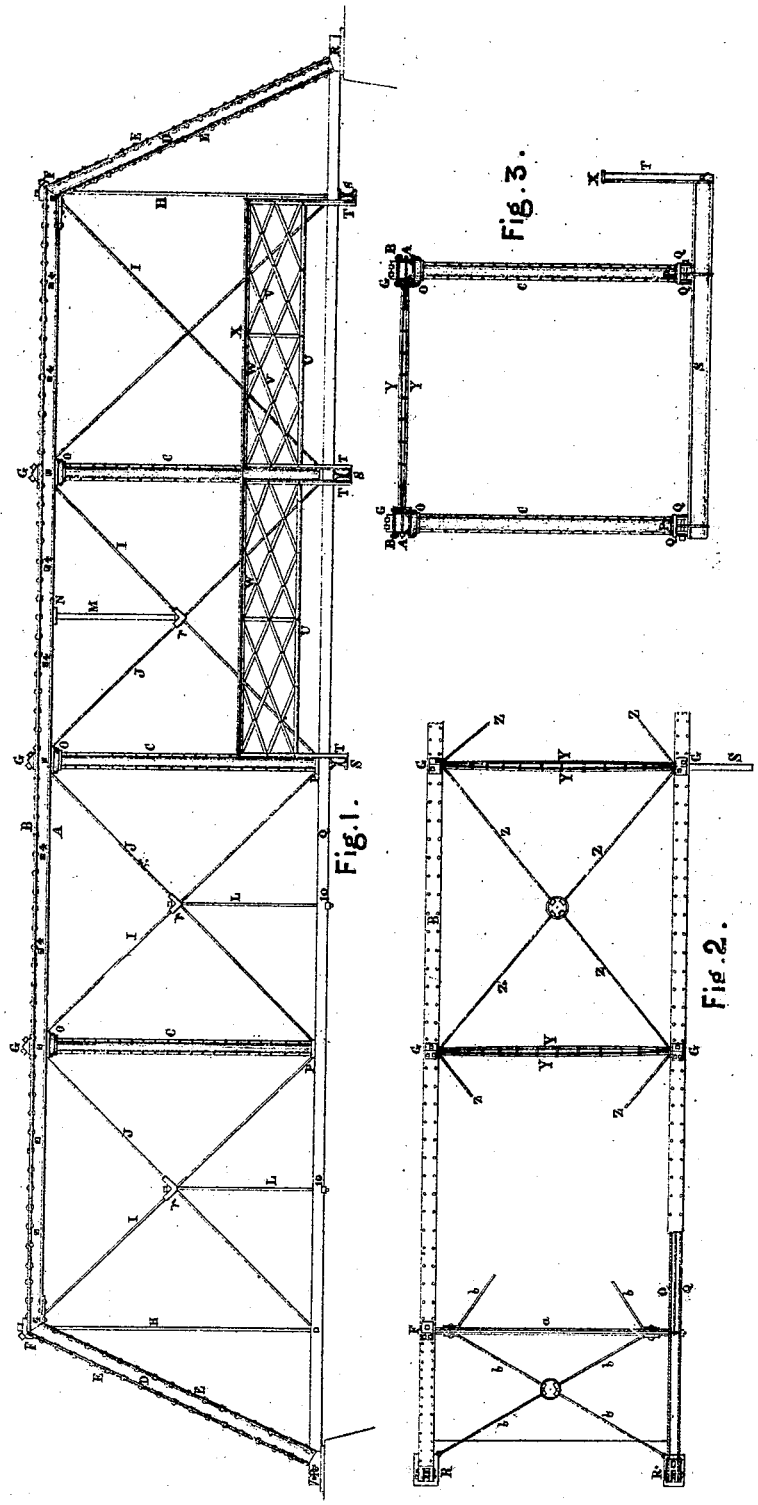

Hammond & Abbott,
Truss Bridge.

No. 102,394. Patented Apr. 26, 1870.

Witnesses.   Inventors.

N. PETERS, PHOTO-LITHOGRAPHER, WASHINGTON, D.C.

Hammond & Abbott,
Truss Bridge.

No. 102,394. Patented Apr. 26, 1870.

Witnesses. Inventors.

N. PETERS, PHOTO-LITHOGRAPHER, WASHINGTON, D. C.

United States Patent Office.

DAVID HAMMOND AND JOB ABBOTT, OF CANTON, OHIO.

Letters Patent No. 102,394, dated April 26, 1870.

IMPROVEMENT IN TRUSS-GIRDER BRIDGES.

The Schedule referred to in these Letters Patent and making part of the same.

*To all whom it may concern:*

Be it known that we, DAVID HAMMOND and JOB ABBOTT, of Canton, in the county of Stark and State of Ohio, have invented certain new and useful Improvements in Truss-Girder Bridges; and we do hereby declare that the following is a full, clear, and exact description of our invention, reference being had to the accompanying drawings forming a part of this specification and to the letters of reference marked thereon, of which drawings—

Figure 1 is an elevation of a bridge showing our improvements.

Figure 2 is a partial plan, showing the arrangement of upper and lower lateral bracing.

Figure 3 is a cross-section of the bridge.

Figure 4:
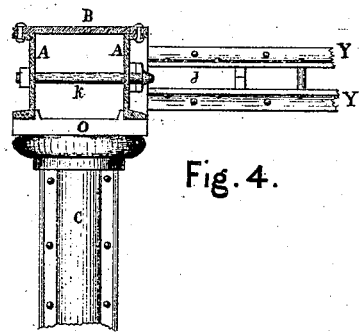
Figure 4 is a detail section of upper chord and side view of upper lateral connection.

Our invention consists, first, in forming a point of suspension from which to support the centers of the sections of the upper or lower chords in a truss having tensional braces, by means of a clamping piece, so secured to the main and counter-braces as to be firmly held against sliding on either of them, in case of the slacking of the other, whereby the main and counter-braces may be used as a part of a suspension truss for supporting the centers of the sections of the chords without any increase of material in said braces.

Our invention consists, secondly, in arrangement of the chord ends, adjusting wedges, and girder-shoes, whereby we obtain a very economical and strong connection, in which a considerable adjustment of the length of either or both chords may be effected by loosening or tightening the nuts on the adjusting wedges, in order to allow for any inaccuracies in construction.

Our invention consists, thirdly, in the use of a pin having its ends fitted in plates secured to the plate-chords of a truss, and with its ends abutting against the inner faces of the chords, whereby we obtain a pin-connection for the main and counter-braces of the truss with the lower chords, and a pin-bearing for the post, if desired, and a distance-piece, against which the chords are clamped, to insure the proper space between them, without the necessity of using link-chords, or of boring pin-holes in the plate-chords, and are enabled to better adapt the cost of construction to the requirements of road bridges.

Our invention consists, fourthly, in the novel mode of securing the ends of the lateral compressive member, and lateral braces to each other and to the chords, and in the novel mode of constructing a wrought-iron connection for a tubular lateral compressive member to the chords, whereby the construction of the lateral bracing is lessened without diminishing its strength.

Our invention consists, fifthly, in the novel mode of uniting the plates forming the lower chords of a girder, whereby the chords are made adjustable in length at the splices without weakening the cords or materially increasing the cost of the splice.

Our invention consists, sixthly, in suspending the iron floor-beams under the lower chords from the bases of the posts of the truss, which rest on the lower chords, whereby the base of the post also serves as the line of support for the floor-beam on the chords, and the post-base, chords, and floor-beams are firmly clamped together, and are prevented from slipping on each other, by the same bolts which carry the floor-beams.

Our invention consists, seventhly, in the use of a saddle-block over the intersection of the upper chord and inclined end-strut of a truss, in which the weight of the central part of the bridge is sustained by rods running from the ends of the upper chords to the opposite corner of the first full section, whereby the weight from said rods is thrown onto both the upper chord and end-strut, at their point of intersection, or nearly so, and the danger of the ends of the chord and strut slipping on each other is fully obviated.

To enable others skilled in the art to make and use our invention we will proceed to describe its construction and operation.

In the girder represented in the annexed drawings, the upper chord is composed of two channel-irons, A A, which have the plate B riveted on them, and are united by bolts, 4 4, passing through intervening clamping pieces in an ordinary manner.

The end-strut consists of two channel-irons, D D, which are united by the plates E E, riveted on at the sides, as shown.

The channel-irons A A and D D are beveled off and abut against each other.

The plate B is extended over the irons D D, and the lower plate E extends under the irons A A, where they are riveted, as shown.

The saddle-blocks F F set over the intersection of the upper chords and end-struts, and the nut-blocks G G are placed on the plate B, where they are prevented from slipping by teats on their lower faces, which fit in holes in the plate B.

Figure 13:
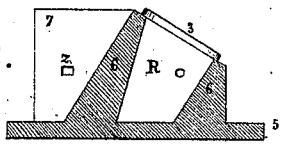
Figure 13 is a vertical longitudinal section of the truss-shoe.
Figure 14:
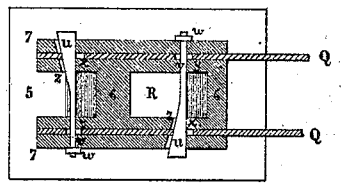
Figure 14 is a longitudinal section of the truss-shoe, taken through the adjusting wedges.
Figure 15:
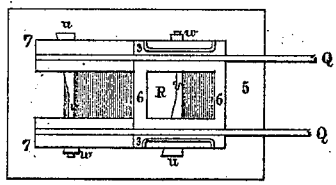
Figure 15 is a plan of the truss-shoe.
Figure 16:
Figure 16 is an end view of the counter-brace end of the clamping-piece at the intersection of the main and counter-braces.
Figure 17:
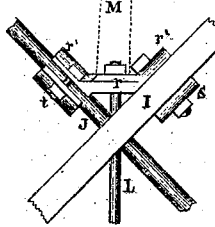
Figure 17 is an end view of the main-brace end of the same.

The end-struts rest on the inclined faces of the truss-shoes R R, and are prevented from slipping on said shoes by the face-flanges 3 3, (see figs. 13 and 15,) which fit in the channel-irons D D.

The chords Q Q are made of plate-iron set up edgewise and parallel to each other, and pass through slots cut in the lower plate E, between the channel-irons D D into slots formed in the shoes R R.

The shoe R consists of the base-plates 5 and side walls 7 7, and cross walls 6 6; the walls 7 7 having the slots for the chords Q Q formed in them, and the beveled faces of the walls 7 7 and cross walls 6 6 forming the seat for the end-struts.

The adjusting wedges $u$ $v$ consist of the wedge part $u$, at the small end of which is the threaded bolt $v$, provided with a nut, $w$.

The slots $x$ and $y$ are cut at the centers of the cords Q Q, the slot $x$ being cut for the bearing face of the wedge $u$, and the slot $v$ being cut to allow of the passage of the bolt end $v$ of the wedge.

The slotted holes $z$ $z$ are cut in each wall 7 of the shoe, and a round hole is bored in the opposite wall, as shown.

The wedges $u$ $v$ are inserted in opposite directions in the shoe, so as to throw the strain from the chords at both sides of the shoe; and the wedges are made of sufficient length to pass through both side walls of the shoe so as to allow of a considerable side draft of the wedge, and consequent adjustment in the length of the chords.

Figure 12:
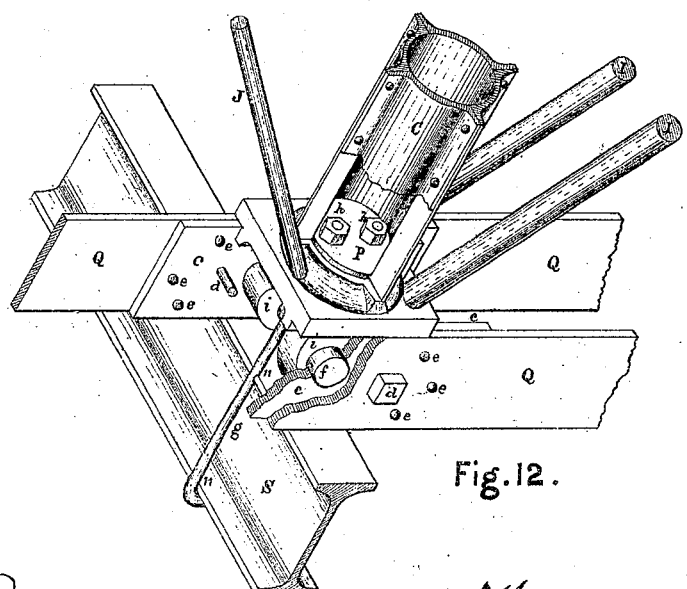
Figure 12 is a perspective view, showing the mode of combining the posts, lower chords, braces and floor-beams.

The bases P of the posts C rest on the chords Q Q, and are held from sliding off by the flanges on their lower sides, as shown in fig. 12.

The plates $c$ $c$ are secured, on the inner sides of the chords Q Q, by rivets $e$ $e$, and have holes bored in them of a suitable size to admit the pin $f$, which passes through eyes formed at the ends of the main braces I I and counter-brace J, and abuts against the chords Q Q at each end, the said chords being held up to the pin $f$ by the bolt or rivets $d$ $d$ at each side of said pin, and extending through both chords Q Q and plates $c$ $c$.

The braces I I J pass up through the post-bases P, or at the sides of said bases, as may be found desirable, and up between the channel-irons A A, through holes formed in the plate B and blocks F G, where they are secured by nuts, as shown.

The end braces I I pass between the channel-irons A, through the plate B and inclined face of the saddle-block F in such position as to cause the plane of the rods I I to cut the beveled plane of intersection of the channel-irons A A and D D at or near the top of the upper chord, so that the strain from said rods is thrown onto both the upper chord and end-strut, and any tendency of one to slide on the other is obviated.

The posts C are made of the "Phœnix" column, and set on the bases P, as shown, being held from slipping by the raised interior portion of the base, as shown in fig. 12.

They may be placed with the plane of two opposite flanges parallel with the chords, as shown in fig. 12, or with two opposite faces parallel with the chords, as shown in figs 1 and 4, as is found desirable, and have the cast head O constructed as shown, to form a bearing for the upper chords.

Figure 5:
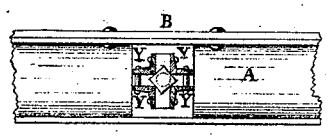
Figure 5 is a side view of upper chord and cross-section of upper lateral compression member.

The upper lateral compressive members, shown in drawings, which form a part of the lateral bracing, uniting the upper chords of the two girders forming the bridge, are made of four angle-irons, Y Y Y Y, which are united by rivets passing through the legs of the angle-irons and thimbles interposed between said legs in such a manner as to form a swelled column of the form and section shown in figs. 2, 3, and 5.

Figure 6:
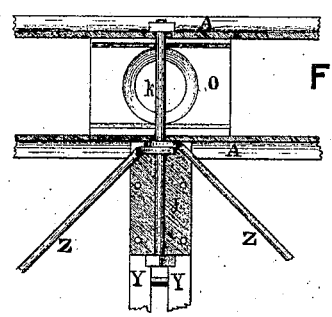
Figure 6 is a longitudinal section taken through center of upper chord and lateral.

The head block $j$ is made of a +-form at one end, and the angle-irons Y Y are riveted between the arms $j^1$ $j^2$ $j^3$ $j^4$, as shown in figs. 4, 5, and 6.

The head $j^5$ is made to fit in the channel-iron A, as shown in fig. 4, and the circular hole $j^6$ is formed in the face of this head to receive the eyes at the ends of the lateral braces Z Z, which come out through the slots $j^7$ $j^7$, as shown in fig. 6.

The bolt $k$ passes through a hole in the block $j$, through the eyes on the laterals Z Z, and through the chords A A, as shown, thus securing the chords and laterals together in a very simple manner.

Figure 7:
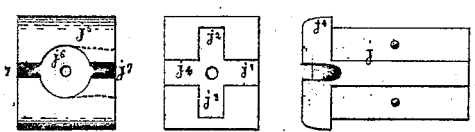
Figures 7 are front and rear end and side views of head-block for upper lateral compression member.
Figure 18:
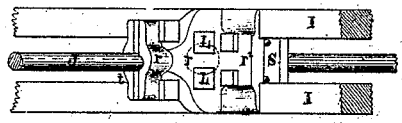
Figures 18 are side view and plan of the clamping piece.

If desired, the head $j^5$ could be cut away at the sides of the hole $j^6$, as indicated by dotted lines in figs. 7, and as shown in fig. 4, in order to allow of the eyes of the braces Z Z, being slipped into position after the compressive member Y Y had been put in place, but the first described construction is preferable.

Where the bridge is to be loaded on the sections of the lower chord, by laying the floor joist across the bridge and on the lower chords, or where the load is carried by floor-beams at the posts and at the centers of the sections, it is desirable to obtain a support for the center of the sections of the lower chords, as shown at left-hand side of fig. 1, and for this purpose the saddle-block $r$ (see fig. 18) is placed on the main braces I I and counter-braces J, and through it pass the rods L L, one rod passing between each main brace and the counter-brace, and the two rods passing between the chords Q Q into a cross-piece, 10, on which the chords Q Q rest, where they are secured by a head or nuts, as shown.

It is obvious that if the saddle-block $r$ were simply laid on the braces I I J, it would sustain the chord-section, but that it would have a transverse strain on the rods I I J. To prevent this, the clamps $s$ and $t$ are placed under the rods I I J, and clamping-bolts are passed through these pieces, and the ends $r^1$ $r^2$ of the saddle-block, by which means it is firmly clamped to both the main and center-braces, so that the strain from the rods L L only produce a tensional strain on the braces I I and J.

Where the bridge is constructed as a deck-bridge, and the load is placed on the sections of the upper chords, the centers of the upper chords should be supported, and for this purpose a compression member, M, is introduced between the saddle-block $r$, and a head-piece, N, placed under the chords A A, as shown in right-hand side of fig. 1.

By clamping the saddle-block $r$ to the braces, the weight is taken from the center of the chord-sections and transferred to the braces, instead of being carried on the chords to the post and there transferred to the braces; consequently the strain on said braces in either case is the same, and no increase of material is required in them.

Where the bridge is to be loaded at the posts, and not on the sections of the chords, it is desirable to have the load applied in the line of the posts, and for this purpose the floor-beams S are suspended under the chords Q Q, by means of a stirrup, $g$, which encircles the beam and has its ends passed up through the post-base P, where they are secured by nuts $h\ h$, as shown in fig. 12.

The stirrup $g$ is notched into the flanges of the beam S at 11 11, so as to prevent the beam from sliding in the stirrup, and it is readily seen that when the nuts $h\ h$ are drawn up tightly there is but little chance for any movement of the post-base or floor-beam on the chords.

Two bolts could be used in place of the stirrup $g$, which should pass through holes in the flanges of the beam, or down at the edges of the flanges into a cross-piece under the beam, but the construction shown is preferred.

Where the plates composing the chords Q Q are to be united, they can be spliced with plates in an ordinary manner, if desired, and where the splices are made at the posts, the splice-plates could also be used as the plates $c\ c$ for the pin $f$; or, where it is desired to increase the thickness of metal in the chords, four plates can be used in the place of two, as is here represented, when the ends of the inner plates, at the points where the parts of the chords are united, can have the holes for the pin $f$ formed in them, and will thus serve as the plates $c\ c$.

Figures 8, 9:
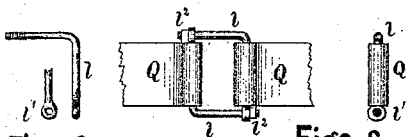
Figures 8 are side views of adjustable chord-splice and end view of one chord and bolt.
Figures 9 are details of bent eye-bolt for splice.

It may be desirable, however, to be able to adjust the length of the chords at the splices, and for this purpose two bent bolts, $l\ l$, having an eye, $l^1$, at one end, and a thread and nut, $l^2$, at the other end, are secured in the ends of the parts Q Q of the chords, by bending the ends of the chords around the bolts $l$ and lap-welding the end to the chord, when the two parts are united, as shown in fig. 8, and the length can be adjusted by the nuts $l^2\ l^2$, as is readily seen.

Figure 10:
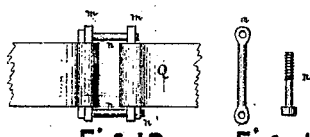
Figure 10 is side view of a modified form of splice.
Figure 11:
Figures 11 are detail views of eye-bolt and connecting-bolt for splice.
Figure 22:
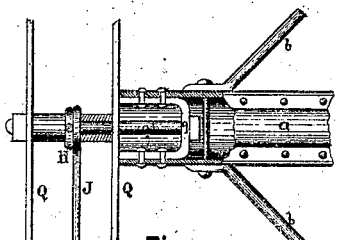
Figure 22 is a detail plan, showing mode of combining a tubular lateral with the chords of the truss.

A modified form of this splice is shown in fig. 10, in which two double-eyed bolts, $m\ m$, are secured in the parts Q Q, as before shown, and the parts are united by the bolts $n\ n$, which can be used with a nut, $n'$, as shown on lower side of fig. 10, or a thread can be cut in the eyes of one of the bolts $m$, into which the thread on the bolt $n$ can work, as shown on upper side of fig. 10.

Where the floor-beams S are used they can also serve as compressive members of the lateral bracing, but if no floor-beams are used a light "Phœnix" column, $a$, can be used, as shown in figs. 2 and 22, to which the lateral braces $b\ b$ can be riveted, as there shown.

In order to unite the column $a$ to the chords, we take a U-shaped piece of wrought-iron, $q$, and insert it in the end of the column, where it can readily be secured by rivets, as shown.

The bolt $q'$ passes through the end of the U and through the chords Q Q, thus uniting the lateral bracing to the chord, and said bolt can also serve as the point of attachment for the end suspension-rod H and counter-brace J, the thimbles being placed on the bolt $q'$, if desired, so as to form a solid connection for the chords, lateral bracing, suspension-rod, and counter-brace.

Figure 21:
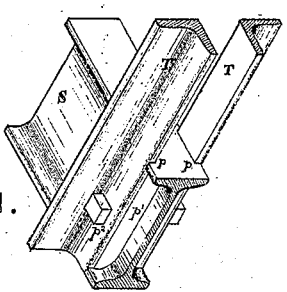
Figure 21 is a perspective view, showing manner of uniting fence to floor-beam.

When iron floor-beams are used, and it is desired to complete the iron superstructure independent of the wooden flooring, the fence-posts T T are secured to the floor-beams S, by cutting notches $p\ p$ in the flanges of the beam, to admit one leg of the angle-iron forming the posts, which are then secured in position by a single bolt, $p^2$, passing through one leg of each angle-iron and the web of the beam S, and through filling-pieces $p^1$, fitting in the sides of the floor-beam S, under the fence-posts, as shown in fig. 21; or two bolts could be used, each passing through the leg of the angle-iron resting against the edges of the beam-flanges, and through the web of the beam, one near the top flange and the other near the bottom flange, when the notches $p$ and pieces $p^1$ could be dispensed with; or the pieces $p^1$ could be omitted in the first construction shown, but the first construction, as shown, is the most desirable.

Figure 19:
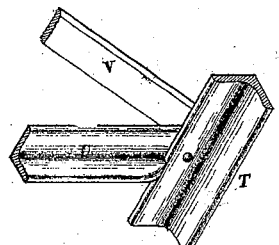
Figure 19 is a perspective view, showing the mode of combining the post and lower rail of the sidewalk fence.

The lower rail U of the fence is made of angle-iron or bar-iron, the angle-iron being preferable for long panels, and is riveted to the post T, together with one of the lattice bars V, as shown in fig. 19, the horizontal leg of the angle-iron being rounded off, as shown, and being arranged as shown, or in a reversed position, as may be desired.

Figure 20:
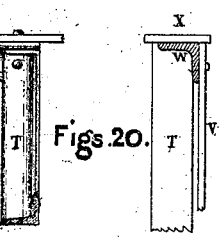
Figures 20 are side and end views of connection between fence-post and upper rail of fence.

The upper end of one leg of the post is bent over, as shown in fig. 20, and the upper rail W of angle-iron fits on the end of the post T, as shown.

The covering-plate X is riveted on the angle-iron W, as shown, a rivet being put through the covering-plate X, angle-iron W, and bent leg of post T, and the covering-plate being extended from one panel to the next, as shown in fig. 1.

The corner lattice-bar V is secured by a rivet passing through the angle-iron W and post T, and the intermediate lattice-bars are riveted to the posts T T, the upper and lower rails W U, and to each other, as shown.

It is evident that the details of the connections of posts T T, rails U W, and lattice-bars V V, could be somewhat varied from those here described, or that the lattice-bars could be placed inside of the angle-iron, if preferred, without affecting the general plan of construction here shown.

It is also evident that the modes of supporting the centers of the sections of the chords herein described are equally applicable to arched truss-girders in which posts and crossed braces are used, and the posts serve as well for suspension-rods as for compressive members of the trussing.

We are aware that auxiliary trusses have been formed in girders; hence we lay no claim to such auxiliary trusses; nor do we claim the use of a wedge for securing the ends of the chords in the girder-shoes; but What we do claim herein as new and of our invention, and desire to secure by Letters Patent, is—

1. Forming a point of suspension from which to support the sections of the upper or lower chords in trusses provided with tensional, main, and counter-braces, by means of a clamping-piece, so secured to said pieces at their intersection as to be held from slipping on either of them in case of the slackening of the other.

2. The combination of the shoe R, provided with the slotted side walls 7 7, chords Q Q, provided with the slots $x$ and $y$, and adjusting-wedges $u\ u$, provided with the bolt-ends $v$, with nuts $w$, the several parts being arranged substantially as and for the purpose specified.

3. The pin $f$, arranged in holes in the plates $c\ c$, or their equivalents, secured on the inner faces of the chords Q Q, the ends of said pin abutting against the inner faces of said chords, so that it serves as the distance-piece against which said chords are clamped, substantially as and for the purpose specified.

4. The combination of the chords Q Q, plates $c\ c$, clamping-bolts or rivets $d\ d$, and pin $f$, the several parts being arranged substantially as and for the purpose specified.

5. The combination of the braces I I J, provided with eyes at their lower ends, pin $f$, plates $c\ c$, chords Q Q, and clamping-bolts or rivets $d\ d$, the several parts being arranged substantially as and for the purpose specified.

6. The head-block $j$, provided with the cavity $j^6$ and slots $j^7 j^7$, when used in combination with the lateral Y Y, braces Z Z, and bolt $k$, the several parts being constructed and arranged substantially as and for the purpose specified.

7. The U-shaped piece $q$, when used in combination with the tubular lateral $a$ and bolt $q'$, substantially as and for the purpose specified.

8. The adjustable chord-splice herein described, the same being constructed with two bolts welded into the ends of the chords, each bolt being provided with an eye and bent bolt-end with nut, or with two eyes and a tie-bolt, substantially as and for the purpose specified.

9. The combination of the post-base P, chords Q Q, stirrup $g$, or its equivalent, and floor-beam S, said post-base resting as a saddle-block on the upper edges of said chords, and the several parts being arranged substantially as and for the purpose specified.

10. The notches 11 11 in the flanges of the floor-beam S, when acting in combination with the stirrup $g$, to prevent the floor-beam from sliding in said stirrup, substantially as and for the purpose specified.

11. The saddle-block F, when used in combination with the upper chord A B A, and strut D E D, and rods I I, substantially as and for the purpose specified.

As evidence that we claim the foregoing, we have hereunto set our hands, in the presence of two witnesses, this 8th day of November, A. D. 1869.

D. HAMMOND.
JOB ABBOTT.

Witnesses:
A. R. McKINLEY,
WM. McKINLEY, Jr.